No. 742,214. PATENTED OCT. 27, 1903.
C. F. McKAY.
ATTACHMENT FOR BLUE FLAME OIL STOVES.
APPLICATION FILED APR. 7, 1902.
NO MODEL.
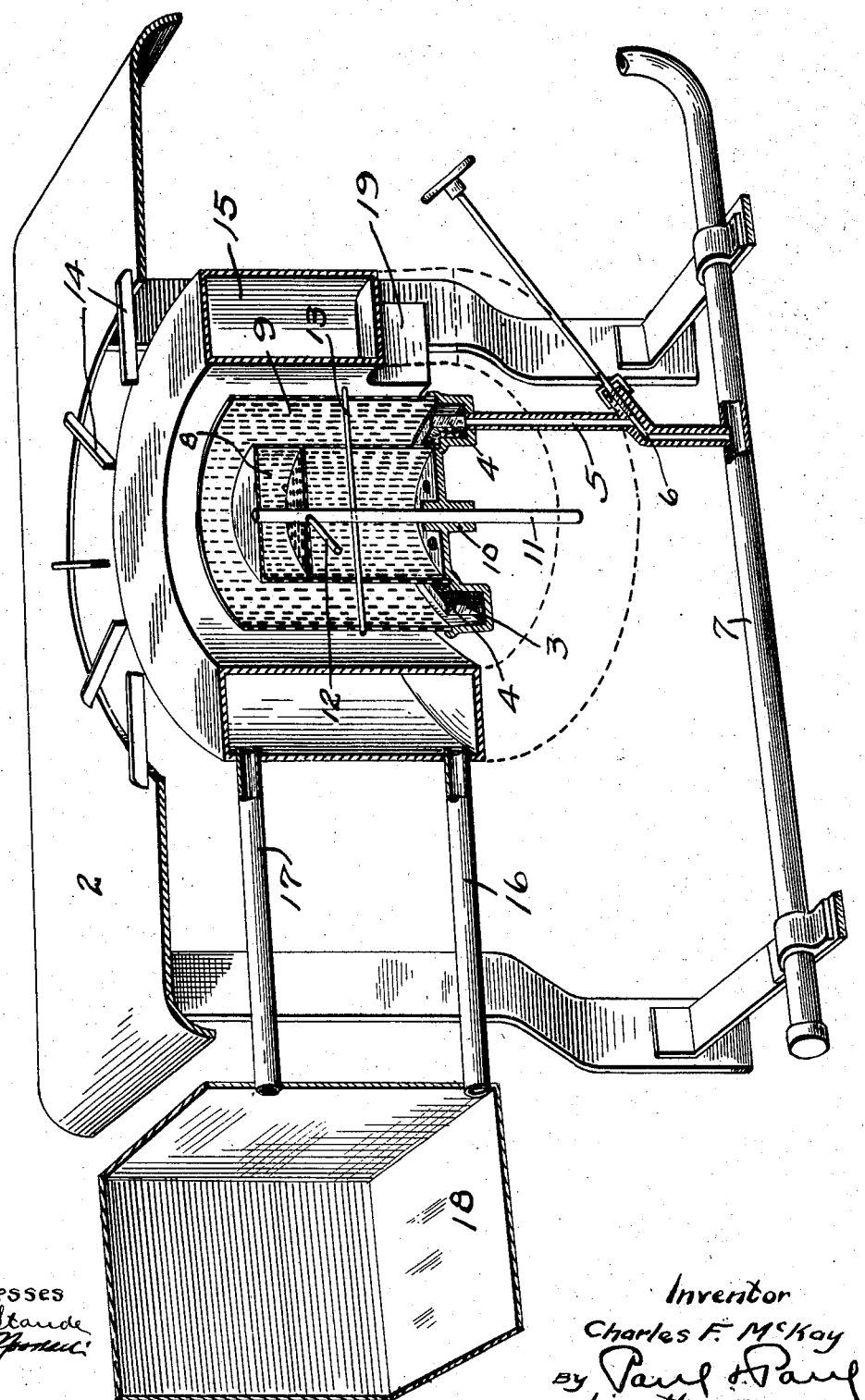
Witnesses
Inventor
Charles F. McKay
By Paul & Paul
his attorneys No. 742,214. Patented October 27, 1903.

UNITED STATES PATENT OFFICE.

CHARLES F. McKAY, OF MINNEAPOLIS, MINNESOTA.

ATTACHMENT FOR BLUE-FLAME OIL-STOVES.

SPECIFICATION forming part of Letters Patent No. 742,214, dated October 27, 1903.

Application filed April 7, 1902. Serial No. 101,647. (No model.)

*To all whom it may concern:*

Be it known that I, CHARLES F. McKAY, of Minneapolis, Hennepin county, Minnesota, have invented certain new and useful Improvements in Attachments for Blue-Flame Oil-Stoves, of which the following is a specification.

The invention relates to stoves used for cooking purposes, and particularly to attachments for the burners thereof, and is designed especially for use with a stove known as the "wickless blue-flame oil-stove," wherein common kerosene is employed in connection with a burner and generator for producing a blue flame with the intense heat necessary in cooking.

The object of my invention is to provide an attachment to inclose the burner for the purpose of utilizing the waste heat therefrom for heating a body of water at the same time that the burner is employed for cooking purposes and which will not in any way obstruct the flames from the burner or deflect the heat which ordinarily would be directed against the cooking utensil above.

The invention consists generally in various constructions and combinations, all as hereinafter described, and particularly pointed out in the claim.

In the accompanying drawing, forming part of this specification, the figure is a perspective of a portion of an oil-stove with my invention applied thereto, the device being shown in section to more clearly illustrate the burner and the water-jacket inclosing the same.

In the drawing, 2 represents a wickless blue-flame oil-stove of the usual construction provided with a burner 3, having an asbestos lighting-ring 4 and a feed-pipe 5, whereon the burner is supported, provided with a valve 6, which controls the admission of oil from the pipe 7 to the burner. The burners for this class of stoves are provided with a device known as a "generator," consisting of an inner perforated cylinder 8, resting upon the burner within the lighting-ring, and an outer perforated cylinder 9, also supported upon the burner outside the lighting-ring. These cylinders are of substantially the same height and extend for a considerable distance above the burner proper. A hub 10 is provided on the burner to receive a rod 11, that is centrally arranged with respect to the inner cylinder and has cross wires or rods 12 and 13, which hold the inner and outer cylinders, respectively, in place on the burner. This construction is all common to oil-stoves of the type known as "wickless blue-flame," and I make no claim to the same herein.

In using the stove the valve 6 is opened, allowing the oil to flow up into the burner which is lighted, and in a few moments a blue flame of intense heat will appear in the upper part of the generator. The griddle or grating 14 is arranged directly over the top of the generator in position for the cooking utensils to receive the heat therefrom. A considerable portion, however, of the heat radiating from the lower portion of the generator below the blue flame is ordinarily wasted, and to utilize this heat I provide an annular water jacket or ring 15, open at the top and bottom and completely surrounding the burner and generator and a suitable distance therefrom. This jacket is adapted to contain a supply of water and is connected by pipes 16 and 17 with a water-tank 18, located near one end of the stove or any suitable distance therefrom. I prefer to provide a recess 19 in the lower edge of the jacket 15 on one side to permit convenient access to the burner for lighting purposes. The jacket is of substantially the same thickness at the top and bottom, and its central opening is of uniform diameter at all points, so that while the walls are sufficiently near the generator to be heated thereby they do not in any way overhang the upper part of the generator or burner to obstruct or deflect the flames or absorb the heat at the upper portion of the generator or in any way cause the cooking utensils to receive less heat than they would if the water-jacket attachment were removed. The jacket merely absorbs the heat that is radiated laterally from the lower part of the generator, which would ordinarily in a stove of this type be wasted and of no aid in cooking. It is obvious that when the tank is filled the water will flow into the jacket and a circulation through the pipes and tank will be formed, and in a short time the contents of the tank will be heated sufficiently for use in cooking or dish-washing; all being accomplished while the burner is being used for cooking and without the use of additional fuel.

I have shown my water-jacket made of sheet metal, preferably of copper; but it will be understood that any suitable material may be employed, the essential feature of the invention being the position of the jacket with respect to the radiating-surface of the generator and the form of the jacket, which allows it to absorb and utilize all the waste heat from the generator, while not in any way obstructing or deflecting the heat that would ordinarily be used in cooking.

I have shown this apparatus applied to a blue-flame oil-stove; but it is also applicable to all forms of oil-burners wherein a generator is employed that is kept heated constantly below the blue flame.

I claim as my invention—

In an oil-stove, the combination, with a wickless burner provided with a perforated cylindrical generator in the upper portion of which a blue flame is formed when the burner is lighted, said generator comprising concentric cylinders, the inner having an imperforate top and the outer an open top, of an annular water jacket or ring inclosing said burner and generator and substantially the same height as the latter and provided with a recess in its lower edge on one side to permit access to said burner for lighting purposes, the inner wall of said jacket being sufficiently near said generator to absorb the waste heat radiating from the lower portion of the same and said wall being substantially the same distance from said generator at all points and vertically and offering no obstruction between the blue flame in the upper part of the generator and the cooking utensil above, a water-tank, and suitable pipes connecting said tank and said jacket.

In witness whereof I have hereunto set my hand this 3d day of April, 1902.

CHARLES F. McKAY.

In presence of—
RICHARD PAUL,
M. C. NOONAN.